(12) United States Patent
Nakamura et al.

(10) Patent No.: US 10,828,992 B2
(45) Date of Patent: Nov. 10, 2020

(54) FUEL CELL UNIT

(71) Applicant: TOYOTA JIDOSHA KABUSHIKI KAISHA, Toyota-shi, Aichi-ken (JP)

(72) Inventors: Ikuhiro Nakamura, Nisshin (JP); Shuji Kawamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 15/926,426

(22) Filed: Mar. 20, 2018

(65) Prior Publication Data

US 2018/0272889 A1 Sep. 27, 2018

(30) Foreign Application Priority Data

Mar. 27, 2017 (JP) .................................. 2017-061543

(51) Int. Cl.
*B60L 11/18* (2006.01)
*B60L 3/00* (2019.01)
(Continued)

(52) U.S. Cl.
CPC ......... *B60L 11/1896* (2013.01); *B60L 3/0007* (2013.01); *B60L 50/71* (2019.02); *B60L 50/72* (2019.02); *B60L 58/40* (2019.02); *H01F 27/025* (2013.01); *H01F 27/10* (2013.01); *H01F 37/00* (2013.01); *H01M 8/0267* (2013.01); *H01M 8/248* (2013.01); *H01M 8/2475* (2013.01); *B60K 2001/0438* (2013.01); *H01F 27/022* (2013.01); *H01F 27/06* (2013.01);
(Continued)

(58) Field of Classification Search
CPC ......... B60K 2001/0438; B60L 11/1896; B60L 3/0007; B60L 50/71; B60L 50/72; B60L 58/40; H01F 27/022; H01F 27/025; H01F 27/06; H01F 27/10; H01F 27/22; H01F 37/00; H01M 2250/20; H01M 8/0267; H01M 8/2475; H01M 8/248; Y02T 90/32; Y02T 90/34
See application file for complete search history.

(56) References Cited

U.S. PATENT DOCUMENTS

2007/0087241 A1\* 4/2007 Mulvenna ......... H01M 8/04089
429/410
2010/0266918 A1 10/2010 Yi et al.
(Continued)

FOREIGN PATENT DOCUMENTS

CN 203326035 U 12/2013
CN 104160543 A 11/2014
(Continued)

*Primary Examiner* — Lingwen R Zeng
(74) *Attorney, Agent, or Firm* — Sughrue Mion, PLLC

(57) ABSTRACT

A fuel cell unit includes a fuel cell stack, a reactor, and a case housing the fuel cell stack and the reactor. The case is provided with an intermediate plate that partitions a space inside the case into an upper space and a lower space. The fuel cell stack is housed in the lower space, with a predetermined clearance provided between the intermediate plate and the fuel cell stack. The reactor is housed in the upper space above the fuel cell stack, with an upper portion of the reactor fixed to the case. A through-hole that is provided in the intermediate plate at a position below the reactor. The lower portion of the reactor faces the through-hole.

6 Claims, 6 Drawing Sheets

(51) Int. Cl.
| | | |
|---|---|---|
| *H01M 8/0267* | (2016.01) | |
| *H01M 8/2475* | (2016.01) | |
| *B60L 50/71* | (2019.01) | |
| *H01F 27/02* | (2006.01) | |
| *B60L 50/72* | (2019.01) | |
| *H01F 37/00* | (2006.01) | |
| *H01F 27/10* | (2006.01) | |
| *H01M 8/248* | (2016.01) | |
| *B60L 58/40* | (2019.01) | |
| *H01F 27/22* | (2006.01) | |
| *H01F 27/06* | (2006.01) | |
| *B60K 1/04* | (2019.01) | |

(52) U.S. Cl.
CPC ......... *H01F 27/22* (2013.01); *H01M 2250/20* (2013.01); *Y02T 90/32* (2013.01); *Y02T 90/34* (2013.01)

(56) References Cited

U.S. PATENT DOCUMENTS

| | | | |
|---|---|---|---|
| 2014/0110185 A1 | 4/2014 | Naito et al. | |
| 2015/0037702 A1* | 2/2015 | Osada | H01M 8/2475 429/452 |

FOREIGN PATENT DOCUMENTS

| | | |
|---|---|---|
| EP | 2827428 A1 | 1/2015 |
| JP | 2002-231292 A | 8/2002 |
| JP | 2011-033340 A | 2/2011 |
| JP | 2012-190812 A | 10/2012 |
| JP | 2014-083875 A | 5/2014 |

* cited by examiner

FUEL CELL UNIT

INCORPORATION BY REFERENCE

The disclosure of Japanese Patent Application No. 2017-061543 filed on Mar. 27, 2017 including the specification, drawings and abstract is incorporated herein by reference in its entirety.

BACKGROUND

1. Technical Field

A technique to be disclosed by the present specification relates to a fuel cell unit. More particularly, the present specification relates to a technique for reducing a space that is required to provide a clearance inside a case of a fuel cell unit. The clearance here means an extra distance to be provided between a component housed in the case and an inner surface of the case, or an extra distance to be provided between components.

2. Description of Related Art

Fuel cells have been attracting attention as a source of electrical power for vehicles. For example, Japanese Patent Application Publication No. 2014-83875 (JP 2014-83875 A) discloses a fuel cell unit that is installed in a front compartment of a vehicle. This fuel cell unit has a case housing a fuel cell stack, and another case housing an electrical component (a high-voltage unit that manages the output voltage of the fuel cell stack) is fixed on the upper side of this case.

SUMMARY

Vehicles are subject to extremely severe restrictions on parts installation space, which require all the parts to be downsized. However, an electrical device requires a predetermined extra distance (clearance) to be provided between a component housed in a case and an inner surface of the case or between components. The fuel cell unit of JP 2014-83875 A requires a clearance between the fuel cell stack and a top plate (or a bottom plate) of the case, as well as between a top plate (or a bottom plate) of the other case and an electrical component inside the case. Thus, the fuel cell unit of JP 2014-83875 A requires two spaces for securing these clearances in the height direction. The present specification provides a technique for reducing a space required for securing a clearance inside a case of a fuel cell unit including a fuel cell stack and an electrical component associated with this fuel cell stack.

A fuel cell unit to be disclosed by the present specification includes a fuel cell stack in which a plurality of single fuel cells is stacked, an electrical component that is electrically connected to the fuel cell stack, and a case that houses the fuel cell stack and the electrical component. The case is provided with an intermediate plate that partitions a space inside the case into an upper space and a lower space. The fuel cell stack is housed in the lower space, with a predetermined clearance provided between the intermediate plate and the fuel cell stack. The electrical component is housed in the upper space above the fuel cell stack, with an upper portion of the electrical component fixed to the case. A through-hole that is large enough for a lower portion of the electrical component to pass through is provided in the intermediate plate at a position below the electrical component, and the lower portion of the electrical component faces the through-hole. The electrical component may be directly fixed to the case, or may be fixed to the case through another member.

In the above fuel cell unit, the electrical component is fixed in the upper portion, and a clearance is required on the lower side of the electrical component. The intermediate plate that partitions the space inside the case is present on the lower side of the electrical component, and this intermediate plate is provided with the through-hole that is large enough for the lower portion of the electrical component to pass through. Thus, the clearance on the lower side of the electrical component can be provided between the electrical component and the fuel cell stack housed in the lower space. On the other hand, the fuel cell stack is housed in the lower space, with a predetermined clearance provided between the fuel cell stack and the intermediate plate above the fuel cell stack. The clearance on the lower side of the electrical component may overlap the clearance on the upper side of the fuel cell stack. Unlike the fuel cell unit of JP 2014-83875 A, the fuel cell unit disclosed by the present specification does not require separately providing these clearances. The fuel cell unit disclosed by the present specification can reduce the space required to provide a clearance for the fuel cell stack and a clearance between electrical components inside the case.

The electrical component may be typically a reactor of a voltage converter that configured to change the voltage output by the fuel cell stack.

To distribute a load on a voltage converter, a plurality of voltage converters connected in parallel to one another is sometimes used. In this case, a plurality of reactors is required. A large through-hole that allows passage of lower portions of these reactors is required in the intermediate plate of the case. However, the case has a role of applying a load to the fuel cell stack along a cell stacking direction. Providing a large through-hole in the intermediate plate may reduce the rigidity of the case that supports the load applied to the fuel cell stack. As a solution, a thorough-hole that is elongated in the cell stacking direction may be provided in the intermediate plate, and the reactors may be arrayed along a long-side direction of the through-hole. Such a through-hole elongated in the cell stacking direction can avoid reducing the rigidity of the case in the stacking direction (the stacking direction of the single fuel cells).

At least one first rib including at least one portion extending along the long-side direction may be provided on an upper surface of the intermediate plate, on each side of the elongated through-hole in a short-side direction thereof. Moreover, (i) the at least first rib surround the through-hole, or (ii) the at least one first rib may include two first ribs, and the ends of the two first ribs in the long-side direction are connected to an inner surface of the case. The first ribs enhance the strength of the case, as well as prevent water droplets having fallen on the intermediate plate from falling through the through-hole onto the fuel cell stack.

Since the reactor is a component that generates heat during operation, a coolant flow passage for cooling the reactor may be required inside the case. In this case, it is desirable that, even if a liquid coolant leaks from the coolant flow passage, this leaking coolant is prevented from falling through the through-hole onto the fuel cell stack. For this purpose, the following structure can be adopted. A coolant flow passage is provided inside the case, above the reactors. The reactors are fixed to a flow passage bottom plate that closes the lower side of the coolant flow passage. Two second ribs extending along the long-side direction are provided on a lower surface of the flow passage bottom plate. The above-described first ribs are located between the two second ribs, below the flow passage bottom plate. In this configuration, any coolant leaking from between joint surfaces of a side wall of the coolant flow passage and the flow passage bottom plate falls onto the intermediate plate by running down the outer side of the second rib of the flow passage bottom plate. Since the leaking coolant falls at a position on the outer side of the first rib (the opposite side from the through-hole), the falling coolant will not fall through the through-hole onto the fuel cell stack.

The flow passage bottom plate may further include the following configuration. A plurality of fins extending along the long-side direction is provided on an upper surface of the flow passage bottom plate. A third rib extending in the short-side direction is provided between the adjacent reactors, on the lower surface of the flow passage bottom plate. According to this configuration, the strength of the flow passage bottom plate is enhanced by the fins and the third ribs that extend so as to intersect with each other. As the fins and the third ribs limit deformation of the flow passage bottom plate, the coolant is less likely to leak from the coolant flow passage.

A lower end of the electrical component may be located at a level equal to or higher than a lower surface of the intermediate plate, and a distance between the lower end of the electrical component and the lower surface of the intermediate plate may be shorter than a predetermined distance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
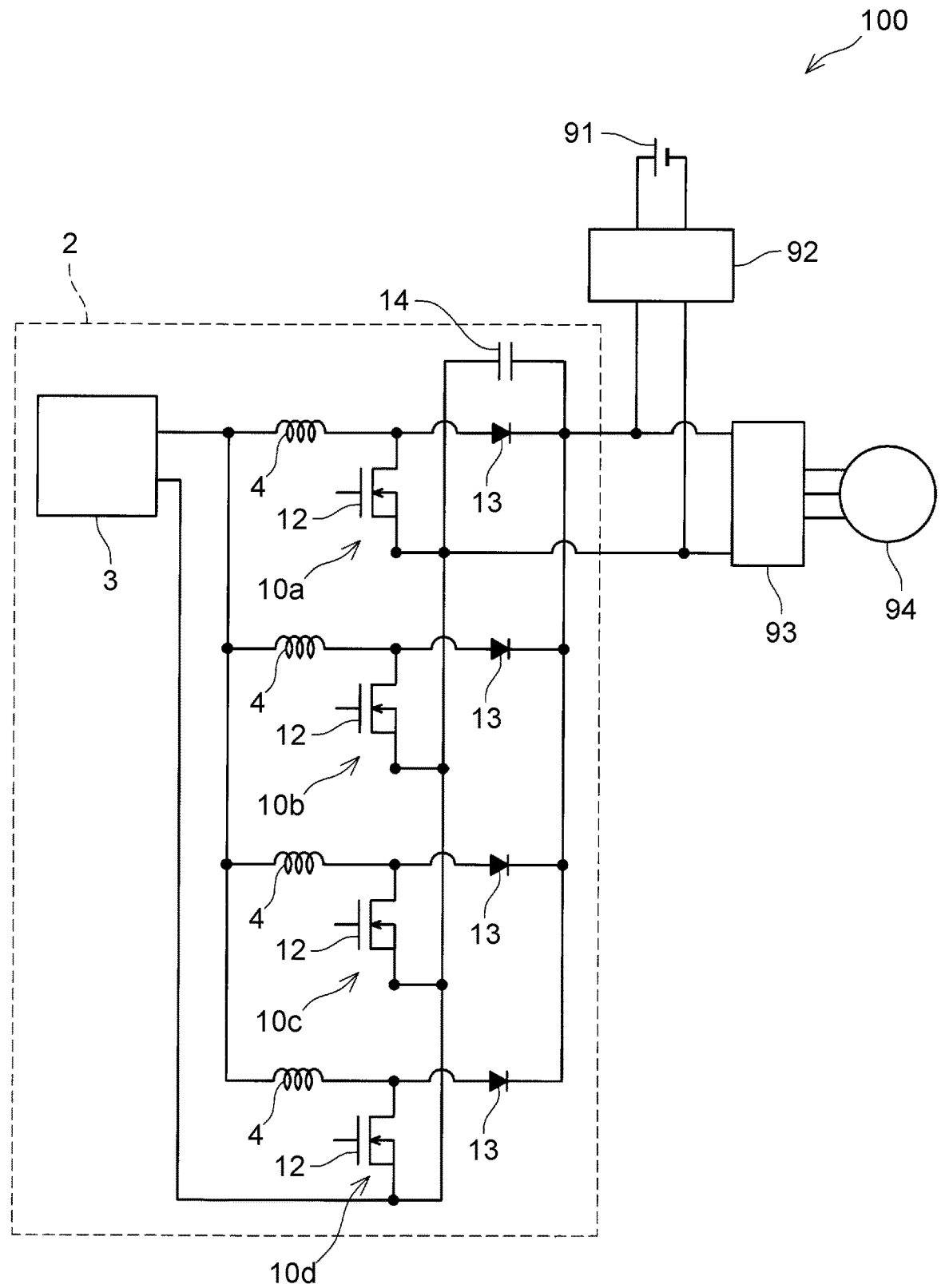
FIG. 1 is a block diagram of an electrical vehicle including a fuel cell unit.

A fuel cell unit of an embodiment will be described with reference to the drawings. First, an electrical circuit of the fuel cell unit will be described with reference to FIG. 1. FIG. 1 is a block diagram of an electrical vehicle 100 including a fuel cell unit 2. The fuel cell unit 2 includes a fuel cell stack 3, a plurality of voltage converters 10a to 10d, and a smoothing capacitor 14. Although the fuel cell unit 2 also includes a pump and other components, these are not shown in the drawings.

The voltage converters 10a to 10d are connected in parallel to one another. The voltage converters 10a to 10d change the output voltage of the fuel cell stack 3. Specifically, the voltage converters 10a to 10d raise the output voltage of the fuel cell stack 3. The voltage converters 10a to 10d each include a reactor 4, a switching element 12, and a rectifier diode 13. The reactor 4 is connected to a positive electrode line of the fuel cell stack 3. The rectifier diode 13 is connected on the side of the reactor 4 closer to a secondary battery 91 (to be described later). The rectifier diode 13 is connected in such a direction that a current flows from the reactor 4 to the secondary battery 91. The switching element 12 is connected to a line between the reactor 4 and the rectifier diode 13, and a negative electrode line such that the switching element 12 is disposed between the lines. When the switching element 12 is operated at an appropriate duty ratio, electrical power with a raised voltage is output to the secondary battery 91 according to the duty ratio.

The smoothing capacitor 14 is connected in parallel to the voltage converters 10a to 10d, on the output side thereof. The smoothing capacitor 14 cancels pulsation of the output current of the voltage converters 10a to 10d.

An inverter 93 is connected on the output side of the voltage converters 10a to 10d. A traction motor 94 is connected to the alternating-current side of the inverter 93. A bidirectional DC-DC converter 92 is connected between the output side of the voltage converters 10a to 10d and the inverter 93. The secondary battery 91 is connected on the farther side of the bidirectional DC-DC converter 92. The inverter 93 converts direct-current power into alternating-current power and outputs this alternating-current power to the motor 94. The inverter 93 also functions to convert alternating-current power generated by the motor 94 (regenerated power) into direct-current power.

The bidirectional DC-DC converter 92 has step-up and step-down functions. The step-up function is a function of raising the output voltage of the secondary battery 91 and supplies this output voltage to the inverter 93. The step-down function is a function of lowering the voltage of regenerated power that has been generated by the motor 94 and converted by the inverter 93 from alternating-current power into direct-current power, and supplying this regenerated power to the secondary battery 91. The inverter 93 converts direct-current power sent from the bidirectional DC-DC converter 92 and the fuel cell unit 2 into alternating-current power suitable for driving the motor 94, and outputs this alternating-current power. As described above, in some cases, the inverter 93 converts alternating-current power generated by the motor 94 during deceleration of the vehicle (regenerated power) into direct-current power.

The time constant of a change in output of the fuel cell stack 3 is longer than the time constant required for the traction motor 94. In other words, the response speed of the output of the fuel cell stack 3 is less than the response speed required for the motor 94. The secondary battery 91 is provided to compensate for electrical power output by the fuel cell stack 3 and to absorb extra electrical power of the fuel cell stack 3. As described above, the secondary battery 91 also stores regenerated power.

As shown in FIG. 1, the fuel cell unit 2 includes the fuel cell stack 3, and the reactors 4 electrically connected to the fuel cell stack 3. In the following, the arrangement of the fuel cell stack 3 and the reactors 4 inside a case of the fuel cell unit 2 and the structure of this case will be described.

Figure 2:
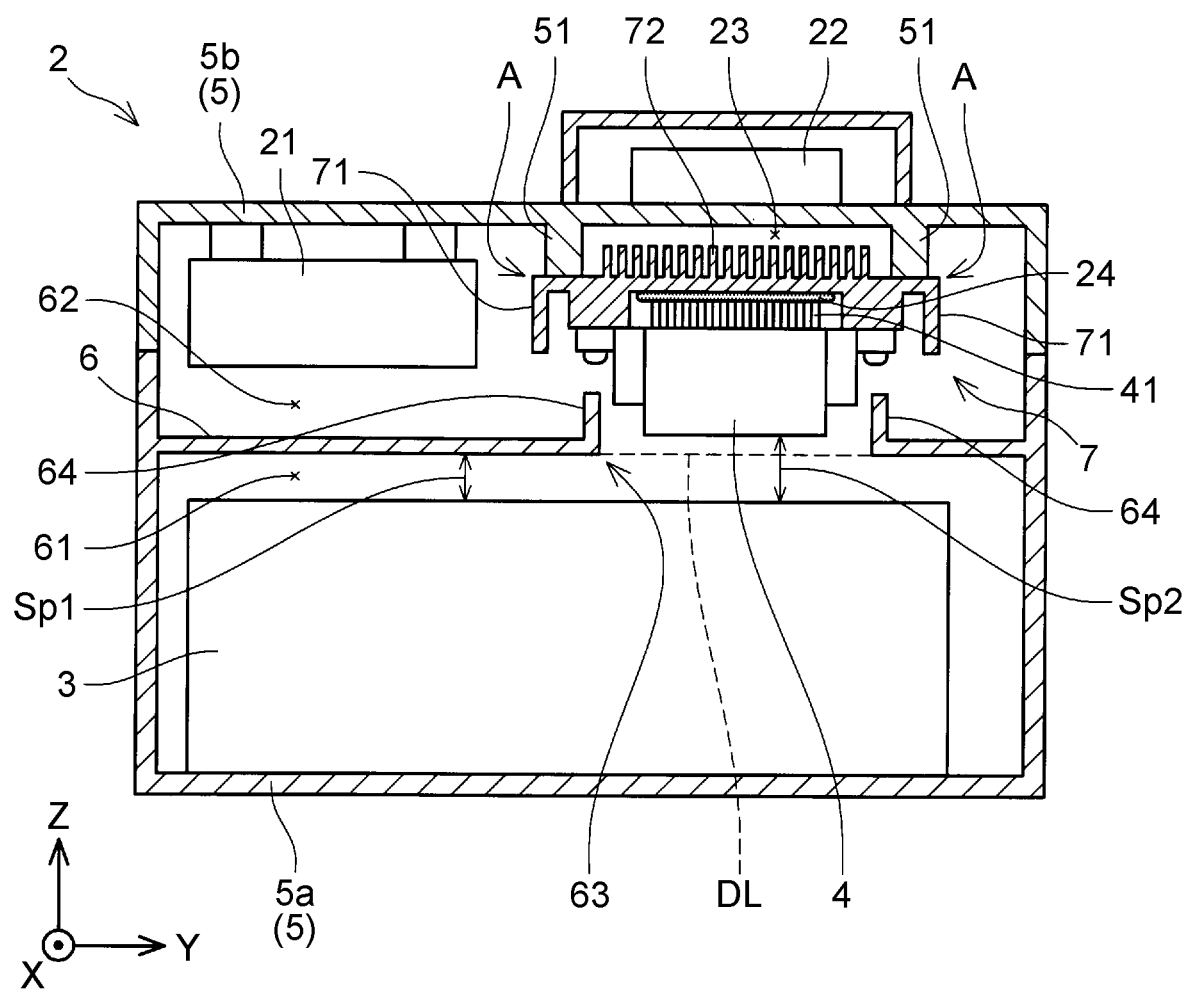
FIG. 2 is a sectional view of a case of the fuel cell unit.

FIG. 2 is a sectional view of a case 5 of the fuel cell unit 2. The case 5 is divided into a lower case 5a housing the fuel cell stack 3 and an upper case 5b connected on the upper side of the lower case 5a. The lower case 5a is provided with an intermediate plate 6 that partitions a space inside the case 5 into a lower space 61 and an upper space 62. The intermediate plate 6 is formed by aluminum die casting integrally with the lower case 5a. Alternatively, the intermediate plate 6 may be a part separate from the lower case 5a. In this case, the intermediate plate 6 is firmly fastened to the lower case 5a.

The fuel cell stack 3 is a stack in which a plurality of single fuel cells 31 (see FIG. 4) is stacked. The lower case 5a (case 5) has a role of applying a load to the fuel cell stack 3 from both sides in a stacking direction of the single fuel cells. The intermediate plate 6 serves as a strength enhancing member that suppresses deformation of the lower case 5a when the lower case 5a applies a load to the fuel cell stack 3.

The voltage converters 10a to 10d shown in FIG. 1 and various other components are housed in the upper case 5b (i.e., the upper space 62). The switching elements 12 and the rectifier diodes 13 shown in FIG. 1 are housed in a resin package. A stack 21 of a plurality of packages is housed in the upper space 62. The reactors 4 are also housed in the upper space 62. The reactors 4 are arrayed in an X-direction in the coordinate system of FIG. 2. The array of the reactors 4 will be described later with reference to FIG. 4 and FIG. 5.

Figure 3:
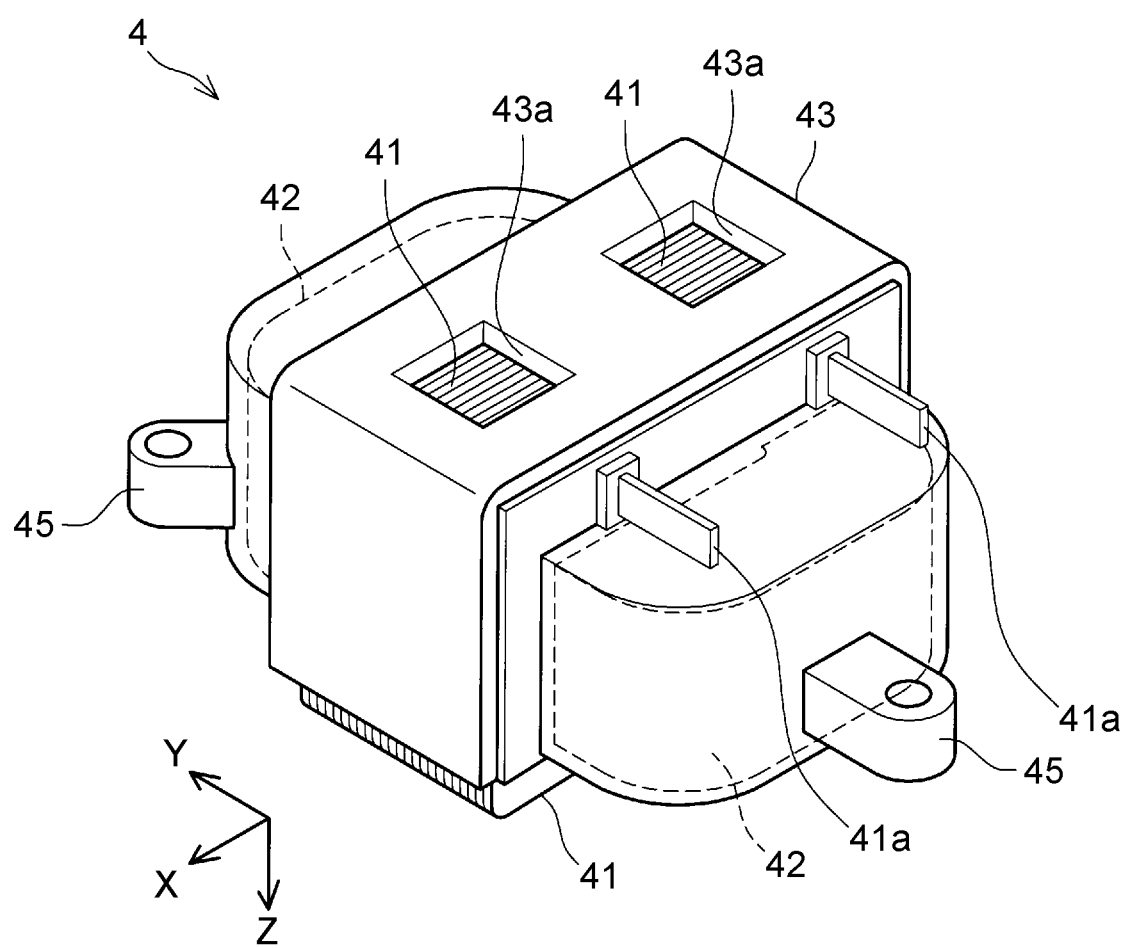
FIG. 3 is a perspective view of a reactor.

Here, the structure of the reactor 4 will be descried with reference to FIG. 3. The reactor 4 has a structure in which a coil 41 is wound around a ring-shaped core 42 at two positions, and the core 42 and the coils 41 are covered with a resin cover 43. In FIG. 3, the core 42 is indicated by the dashed lines, as it is covered with the resin cover 43 and invisible. A projection 45 through which a bolt for fixing the reactor 4 is passed is provided at three positions in the resin cover 43 (one projection 45 is located on the rear side and therefore invisible in FIG. 3). Part of each coil 41 is exposed from the resin cover 43. The entire surface of one side (the lower surface in FIG. 3) of each coil 41 is exposed from the resin cover 43. Part of the surface of another side (the upper surface in FIG. 3) of each coil 41 is exposed through a window 43a provided in the resin cover 43. A lead 41a of each coil 41 is shown in FIG. 3.

Referring back to FIG. 2, the structure of the case 5 and the arrangement of the reactors 4 in the upper space 62 will be further described. The reactor 4 shown in FIG. 3 is shown upside down in FIG. 2. Specifically, the lower sides of the coils 41 are exposed from the resin cover 43 in FIG. 3, while the upper sides of the coils 41 are exposed in FIG. 2.

A coolant flow passage 23 is formed above the reactor 4. The coolant flow passage 23 is a space surrounded by part of the upper case 5b, a pair of ridges 51 protruding inward from the upper case 5b, and a flow passage bottom plate 7. A liquid coolant flows through the coolant flow passage 23. The ridges 51 form side walls of the coolant flow passage 23. The flow passage bottom plate 7 is in contact with lower surfaces of the ridges 51 through a seal material or a gasket (neither is shown). In other words, the flow passage bottom plate 7 closes the lower side of the coolant flow passage 23. The seal material or the gasket prevents the coolant from leaking from between the ridges 51 and the flow passage bottom plate 7. An inverter 22 that drives a fuel cell pump (not shown) is disposed on a top plate of the upper case 5b that corresponds to an upper plate of the coolant flow passage 23. The inverter 22 is thermally coupled to the coolant flow passage 23 through the top plate, and is cooled by the coolant flowing through the coolant flow passage 23.

Figure 4:
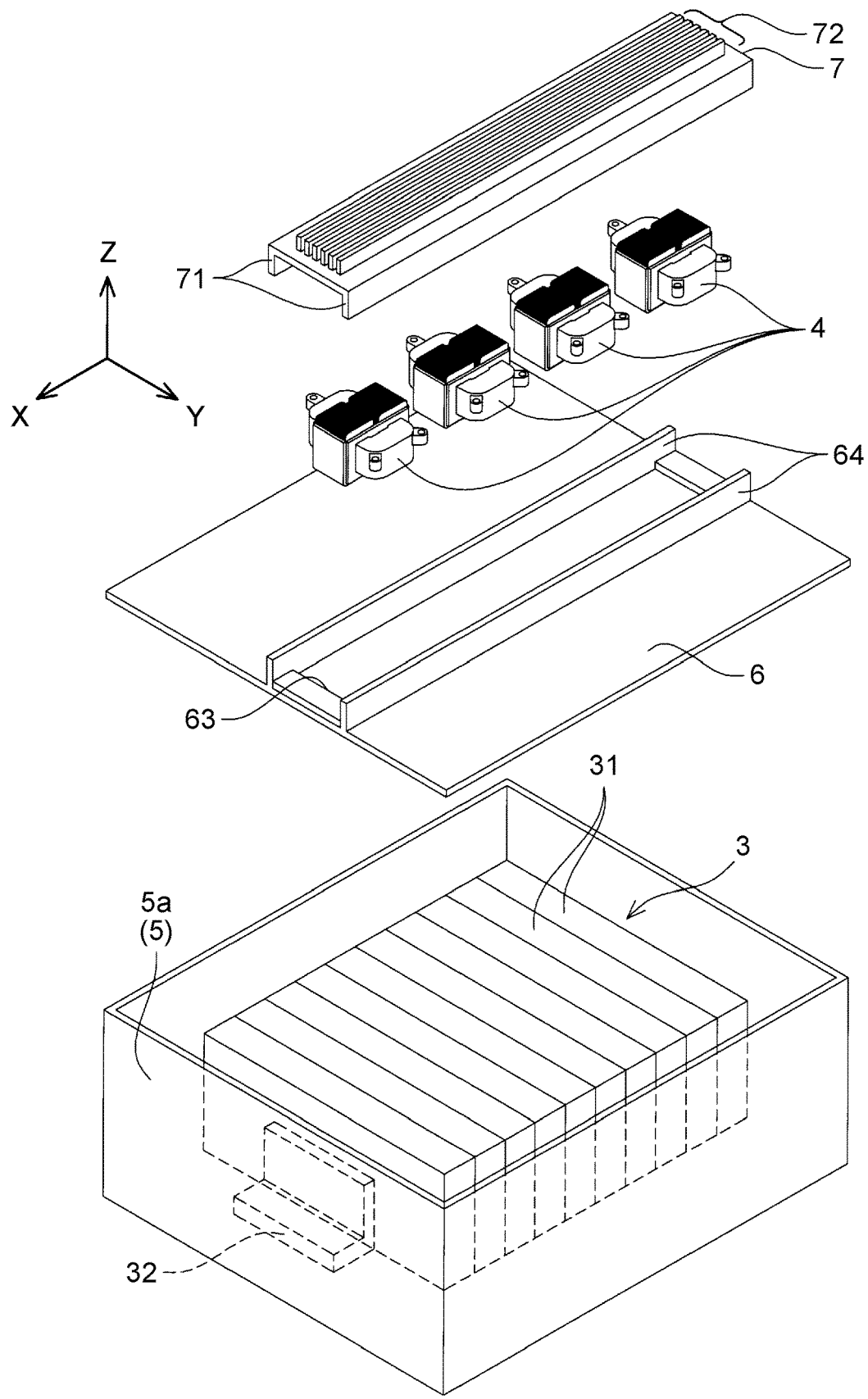
FIG. 4 is a perspective view of the case, an intermediate plate, the reactor, and a flow passage bottom plate.
Figure 5:
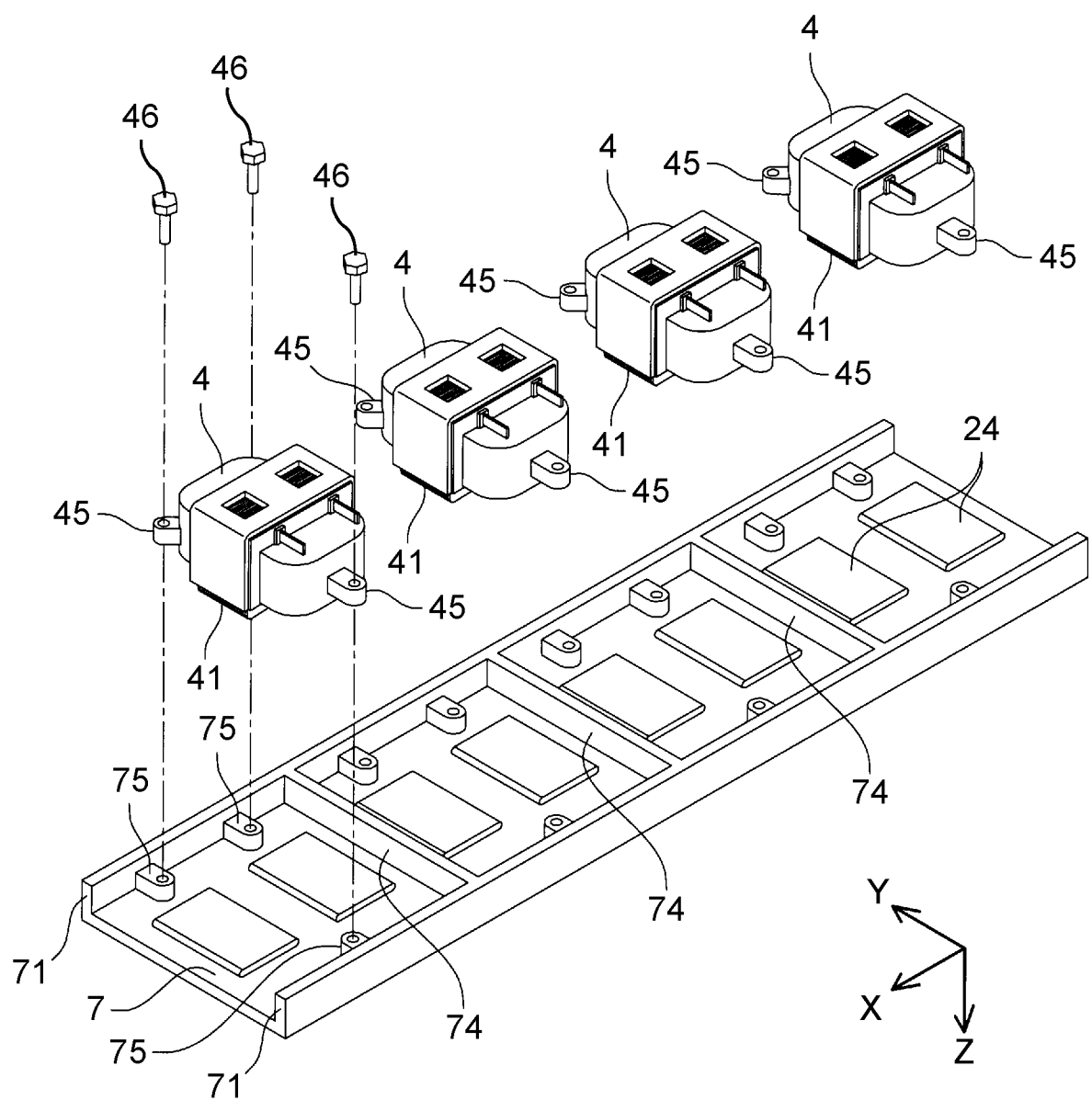
FIG. 5 is a perspective view of the flow passage bottom plate and a plurality of reactors as seen from an obliquely lower side.
Figure 6:
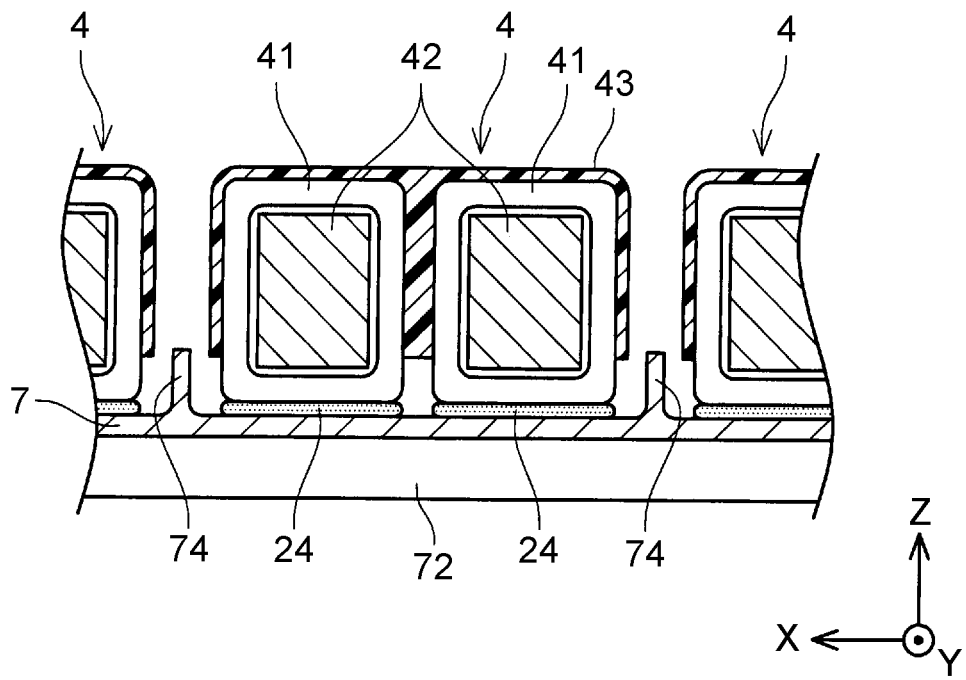
FIG. 6 is a sectional view of the flow passage bottom plate and the reactors as cut along a long-side direction of the flow passage bottom plate.

The reactors 4 are fixed to a lower surface of the flow passage bottom plate 7. Since the flow passage bottom plate 7 is fixed to the upper case 5b, the reactors 4 are fixed to the upper case 5b (i.e., the case 5) through the flow passage bottom plate 7. One side surface of each coil 41 of the reactor 4 is thermally connected to the flow passage bottom plate 7 through a heat transfer sheet 24. FIG. 4 is an exploded perspective view of the lower case 5a housing the fuel cell stack 3, the intermediate plate 6, the reactors 4, and the flow passage bottom plate 7, as separated from one another in the up-down direction. FIG. 5 is a perspective view of the flow passage bottom plate 7 and the reactors 4 as seen from the lower side in FIG. 4. FIG. 6 is a sectional view of the flow passage bottom plate 7 and the reactors 4 as cut along an XZ-plane indicated in FIG. 6. In the following, the installation structure of the reactors 4 will be described with reference to FIG. 4 to FIG. 6 along with FIG. 2.

The fuel cell stack 3 is housed in the lower case 5a (i.e., the lower space 61). The fuel cell stack 3 is a stack in which the single fuel cells 31 are stacked. The X-direction in FIG. 4 corresponds to the stacking direction of the single fuel cells 31 (see FIG. 4). In the other drawings, too, the X-direction in the coordinate system indicated therein corresponds to the stacking direction of the single fuel cells 31. The lower case 5a is provided with a presser plate 32 that applies a load to the fuel cell stack 3. The case 5 applies a load in the stacking direction of the single fuel cells 31 through the presser plate 32 to the fuel cell stack 3. One end of the fuel cell stack 3 in the stacking direction is in contact with an inner surface of the lower case 5a, and the presser plate 32 applies a load to the fuel cell stack 3 from the other end side.

The reactors 4 are arrayed along the X-direction in the drawings, and are fixed to the lower surface of the flow passage bottom plate 7 that is long in the X-direction. As described above, the projection 45 is provided at three positions in the resin cover of the reactor 4. In FIG. 5, three fixing bolts 46 are depicted for only the reactor 4 on the left, while the bolts for the other reactors 4 are not shown. The bolt 46 passed through the projection 45 of the reactor 4 engages in a screw hole of a projection 75 provided on the flow passage bottom plate 7, and the reactor 4 is thereby fixed to the flow passage bottom plate 7 (see FIG. 5). As shown in FIG. 5, not only the projections 75 corresponding to the reactor 4 on the left but also those corresponding to the other reactors 4 are provided.

The heat transfer sheets 24 are sandwiched between the coils 41 of the reactor 4 and the flow passage bottom plate 7. As shown in FIG. 5, not only the heat transfer sheets 24 corresponding to the reactor 4 on the right but also those corresponding to the other reactors 4 are provided. The coils 41 of the reactor 4 are thermally coupled to the flow passage bottom plate 7 through the heat transfer sheets 24. A plurality of fins 72 is provided on the upper surface of the flow passage bottom plate 7, i.e., on the surface exposed to the coolant flow passage 23 (see FIG. 2 and FIG. 4). The coils 41 of the reactor 4 generate heat when a current flows therethrough. The heat of the coils 41 is efficiently absorbed by the coolant through the heat transfer sheets 24 and the fins 72.

As shown in FIG. 2, the reactors 4 are housed in the upper space 62 so as to be located above the fuel cell stack 3. The fuel cell stack 3 is housed in the lower space 61, with a predetermined clearance Sp1 provided between the intermediate plate 6 and the fuel cell stack 3. On the other hand, upper portions of the reactors 4 are fixed to the flow passage bottom plate 7, and there is a space on the lower side of the reactors 4. The intermediate plate 6 is provided with a through-hole 63 that is elongated in the X-direction (see FIG. 2 and FIG. 4). The through-hole 63 is provided in the intermediate plate 6 so as to be located below the reactors 4 (see FIG. 2 and FIG. 4). The through-hole 63 is at least large enough for the lower portions of the reactors 4 to pass through. The reactors 4 are disposed so that the lower portions thereof closely face the through-hole 63. In other words, the lower surfaces of the reactors 4 faces an upper surface of the fuel cell stack 3 through the through-hole 63. The lower portion of the reactor 4 means a portion up to a predetermined height (e.g., 1 cm) from a lower end of the reactor.

The clearance Sp1 between the intermediate plate 6 and the fuel cell stack 3 is a clearance that is provided so that the fuel cell stack 3 does not come in contact with the intermediate plate 6. When a cable etc. is passed through above the fuel cell stack 3, the clearance Sp1 is provided also to provide a space for the cable etc. to pass through. On the other hand, it is also necessary to provide a clearance on the lower side of the reactors 4 so that the reactors 4 do not come in contact with the intermediate plate 6, or to allow a cable etc. to pass through below the reactors 4. The through-hole 63 allows the clearance that should be provided on the lower side of the reactors 4 to overlap the clearance (clearance Sp1) provided above the fuel cell stack 3, and thus contributes to reducing the space for these clearances. Since the upper portions of the reactors 4 are fixed to the case 5 and a clearance is provided below the reactors 4, it is possible to overlap the clearance below the reactors 4 with the clearance provided above the fuel cell stack 3.

The clearance (space) Sp1 shown in FIG. 2 is a clearance provided between the fuel cell stack 3 and the intermediate plate 6. The clearance (space) Sp2 is a clearance between the fuel cell stack 3 and the reactors 4. As shown in FIG. 2, overlapping the space for securing a clearance for the fuel cell stack 3 and the space for securing a clearance for the reactors 4 can reduce the space required for these clearances in the fuel cell unit 2 of this embodiment.

The reactors 4 are fixed to the upper case 5b through the flow passage bottom plate 7 so that the lower ends of the reactors 4 do not protrude downward beyond the intermediate plate 6. In other words, the reactors 4 are fixed to the upper case 5b through the flow passage bottom plate 7 so that the lower ends of the reactors 4 are located at a level equal to or higher than a lower surface of the intermediate plate 6 (the dashed line DL in FIG. 2). This is to prevent the fuel cell stack 3 from getting damaged on contact with the lower ends of the reactors 4 in the event that the vehicle collides and the case 5 is crushed by the impact. The reactors 4 are preferably fixed so that the lower ends thereof are substantially flush with the lower surface of the intermediate plate 6. One example of the arrangement "the reactors 4 are disposed so that the lower portions thereof closely face the through-hole 63" is an arrangement in which the lower ends of the reactors 4 are disposed between the first ribs 64. Thus, the reactors 4 can be disposed at a lower level than when the through-hole 63 is not provided.

As shown in FIG. 4, the through-hole 63 is elongated in the stacking direction of the single fuel cells 31 (the X-direction in the drawings), and the reactors 4 are arrayed along the X-direction, i.e., the stacking direction. As described above, the lower case 5a applies a load in the stacking direction (the X-direction in the drawings) to the fuel cell stack 3. As described above, the intermediate plate 6 is a member that is integral with the lower case 5a (case 5) and serves to secure the strength of the lower case 5a (case 5) in the X-direction in the drawings. Providing the intermediate plate 6 with a through-hole that is wide in the Y-direction in the drawings would reduce the strength of the lower case 5a in the X-direction. In the fuel cell unit 2 of the embodiment, the reactors 4 are arrayed in the X-direction, and the through-hole 63 is elongated in the X-direction, so as to minimize the width of the through-hole 63 in the Y-direction. This structure can secure the strength of the lower case 5a in the X-direction.

The first rib 64 is provided on the upper surface of the intermediate plate 6, on each side of the through-hole 63 in the Y-direction. Both ends of the first ribs 64 are in contact with an inner surface of the lower case 5a (case 5). The first ribs 64 enhance the strength of the intermediate plate 6, as well as prevent water having fallen on the intermediate plate 6 from falling through the through-hole 63 onto the fuel cell stack 3.

The liquid coolant can leak from the coolant flow passage 23. As described above, the flow passage bottom plate 7 is joined to the lower surfaces of the ridges 51 through a seal material or a gasket (neither is shown). The liquid coolant can leak from joint areas between the flow passage bottom plate 7 and the ridges 51 (the areas indicated by the arrows A in FIG. 2). The fuel cell unit 2 of the embodiment has a feature that prevents any coolant that may leak from the joint areas A from falling through the through-hole 63 onto the fuel cell stack 3. This feature will be described next.

As shown in FIG. 2 and FIG. 4, a second rib 71 extending in the X-direction is provided at each end of the lower surface of the flow passage bottom plate 7 in the Y-direction. As shown in FIG. 2, the first ribs 64 provided on the intermediate plate 6 are located between the two second ribs 71, below the flow passage bottom plate 7. According to this structure, if a coolant leaks from the joint areas between the flow passage bottom plate 7 and the ridges 51 (the areas indicated by the arrows A in FIG. 2), this leaking coolant falls onto the intermediate plate 6 by running down the outer side of the second ribs 71. The coolant falls at a position in the intermediate plate 6 on the outer side of the first ribs 64 (the opposite side from the through-hole 63). Thus, the coolant having fallen on the upper surface of the intermediate plate 6 is blocked by the first ribs 64 from falling through the through-hole 63. Both ends of the first ribs 64 are in contact with the inner surface of the lower case 5a (case 5). Instead of this structure, an annular first rib may be provided so as to surround the through-hole 63. Such an annular first rib can also prevent the liquid coolant from falling onto the fuel cell stack 3.

As shown in FIG. 2 and FIG. 4, a plurality of fins 72 extending in the X-direction is provided on the upper surface (the surface exposed to the coolant) of the flow passage bottom plate 7. As shown in FIG. 5, a third rib 74 extending in the Y-direction is provided between the adjacent reactors 4, on the lower surface (the surface coming in contact with the reactors 4) of the flow passage bottom plate 7. The extension direction of the fins 72 (X-direction) and the extension direction of the third ribs 74 (Y-direction) intersect with each other. The rigidity of the flow passage bottom plate 7 is enhanced by the fins 72 and the third ribs 74 intersecting with each other. As the rigidity of the flow passage bottom plate 7 is enhanced, the flow passage bottom plate 7 becomes less likely to deform. It is therefore less likely that a gap is left between the flow passage bottom plate 7 and the ridges 51. As a result, the coolant is less likely to leak from between the flow passage bottom plate 7 and the ridges 51.

Figure 7:
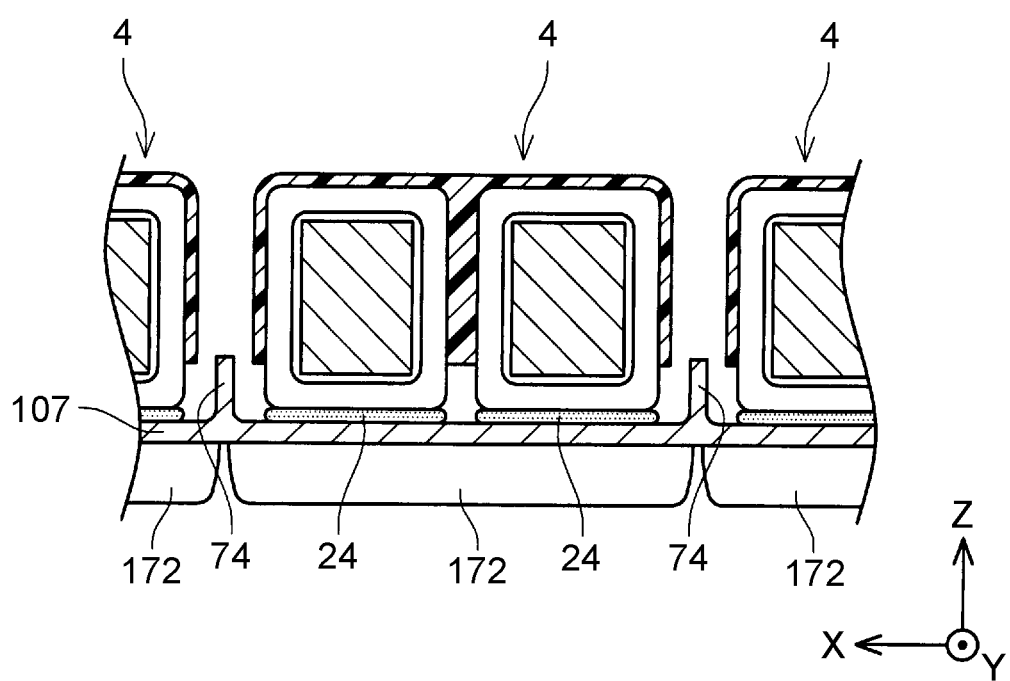
FIG. 7 is a sectional view illustrating a modified example of the shape of fins.

FIG. 7 shows fins 172 in a modified example. Like the fins 172, the fin extending in the X-direction may terminate at an intermediate point in the X-direction.

Here is one point to note on the technique having been described in the embodiment: The fuel cell unit 2 of the embodiment includes four reactors 4. However, the number of the reactor 4 is not limited to four.

While the specific examples of the present disclosure have been described in detail above, these examples are merely illustrative and do not limit the present disclosure. The present disclosure includes the above-illustrated specific examples with various modifications and changes added thereto, within the scope of the claims. The technical elements described in the present specification or the drawings exhibit technical utility independently or in various combinations, without limiting the present disclosure. The technique illustrated in the present specification or the drawings can achieve a plurality of objects at the same time, and has technical utility simply by achieving one of these objects.

What is claimed is:

1. A fuel cell unit comprising:
a fuel cell stack in which a plurality of single fuel cells is stacked;
an electrical component that is electrically connected to the fuel cell stack; and
a case housing the fuel cell stack and the electrical component,
wherein the case is provided with an intermediate plate that partitions a space inside the case into an upper space and a lower space,
wherein the fuel cell stack is housed in the lower space, with a predetermined clearance provided between the intermediate plate and the fuel cell stack,
wherein the electrical component is housed in the upper space above the fuel cell stack, with an upper portion of the electrical component fixed to the case,
wherein a through-hole that is large enough for a lower portion of the electrical component to pass through is provided in the intermediate plate at a position below the electrical component,
wherein the lower portion of the electrical component faces the through-hole, and
wherein the electrical component is a reactor of a voltage converter that is configured to change an output voltage of the fuel cell stack.

2. The fuel cell unit according to claim 1, wherein
the case configured to apply a load to the fuel cell stack along a stacking direction of the single fuel cells;
the through-hole is elongated in the stacking direction; and
a plurality of reactors is arrayed along a long-side direction of the through-hole.

3. The fuel cell unit according to claim 2, wherein
at least one first rib including at least one portion extending along the long-side direction is provided on an upper surface of the intermediate plate, on each side of the elongated through-hole in a short-side direction thereof; and
(i) the at least one first rib surrounds the through-hole, or (ii) the at least one first rib includes two first ribs, and ends of the two first ribs in the long-side direction are connected to an inner surface of the case.

4. The fuel cell unit according to claim 3, wherein
a coolant flow passage is provided inside the case, above the reactors;
the reactors are fixed to a flow passage bottom plate that closes a lower side of the coolant flow passage;
two second ribs extending along the long-side direction are provided on a lower surface of the flow passage bottom plate; and
the first ribs are located between the two second ribs, below the flow passage bottom plate.

5. The fuel cell unit according to claim 4, wherein
a plurality of fins extending along the long-side direction is provided on an upper surface of the flow passage bottom plate, and a third rib extending in the short-side direction is provided between the adjacent reactors, on the lower surface of the flow passage bottom plate.

6. The fuel cell unit according to claim 1, wherein
a lower end of the electrical component is located at a level equal to or higher than a lower surface of the intermediate plate, and a distance between the lower end of the electrical component and the lower surface of the intermediate plate is shorter than a predetermined distance.

* * * * *